(No Model.) 2 Sheets—Sheet 1.
E. HUDSON.
STEREOPTICON.
No. 518,104. Patented Apr. 10, 1894.
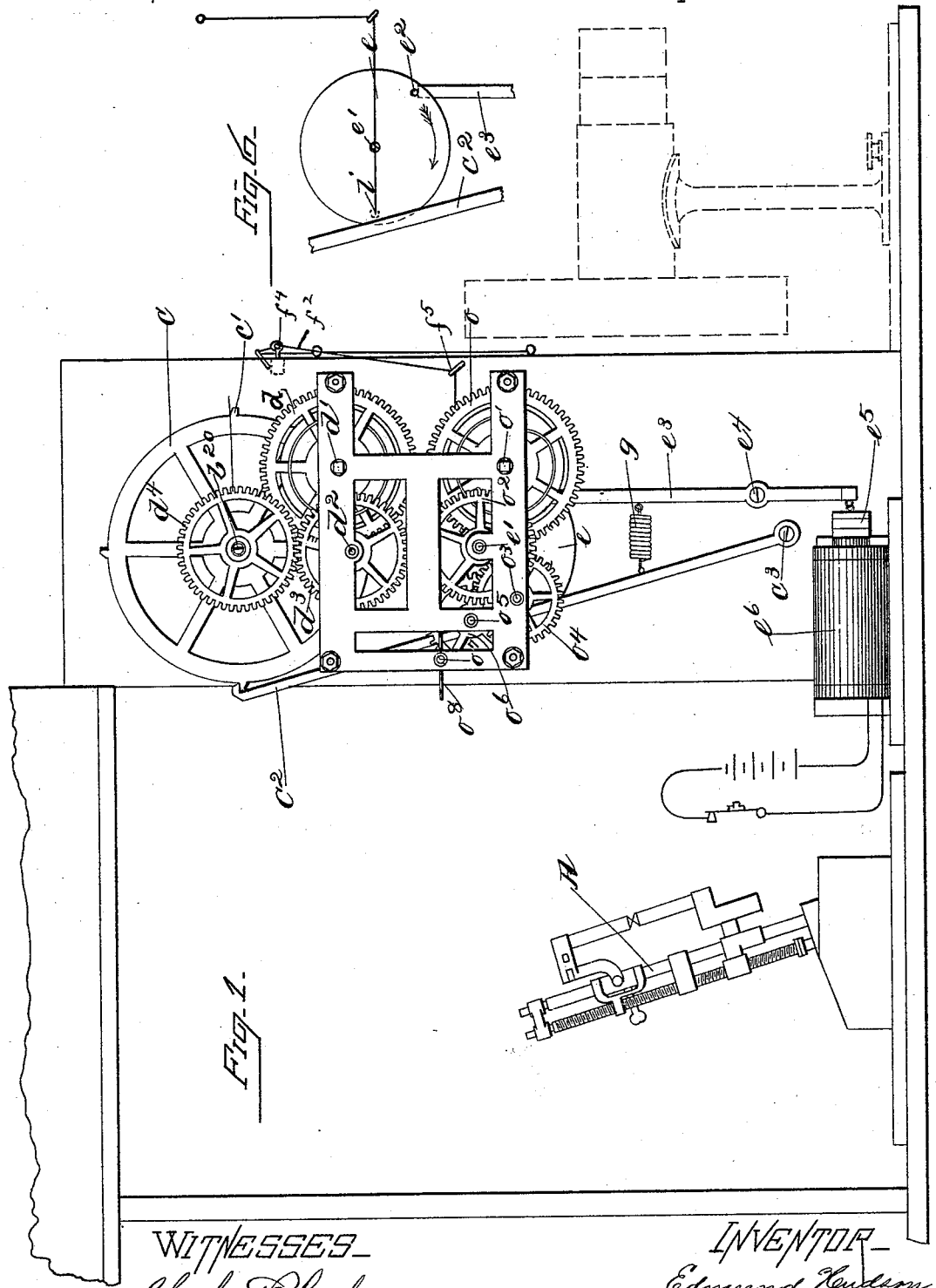
WITNESSES
Charles B. Crocker.
Eva S. Rounds
INVENTOR
Edmund Hudson
by B. J. Noyes,
atty.

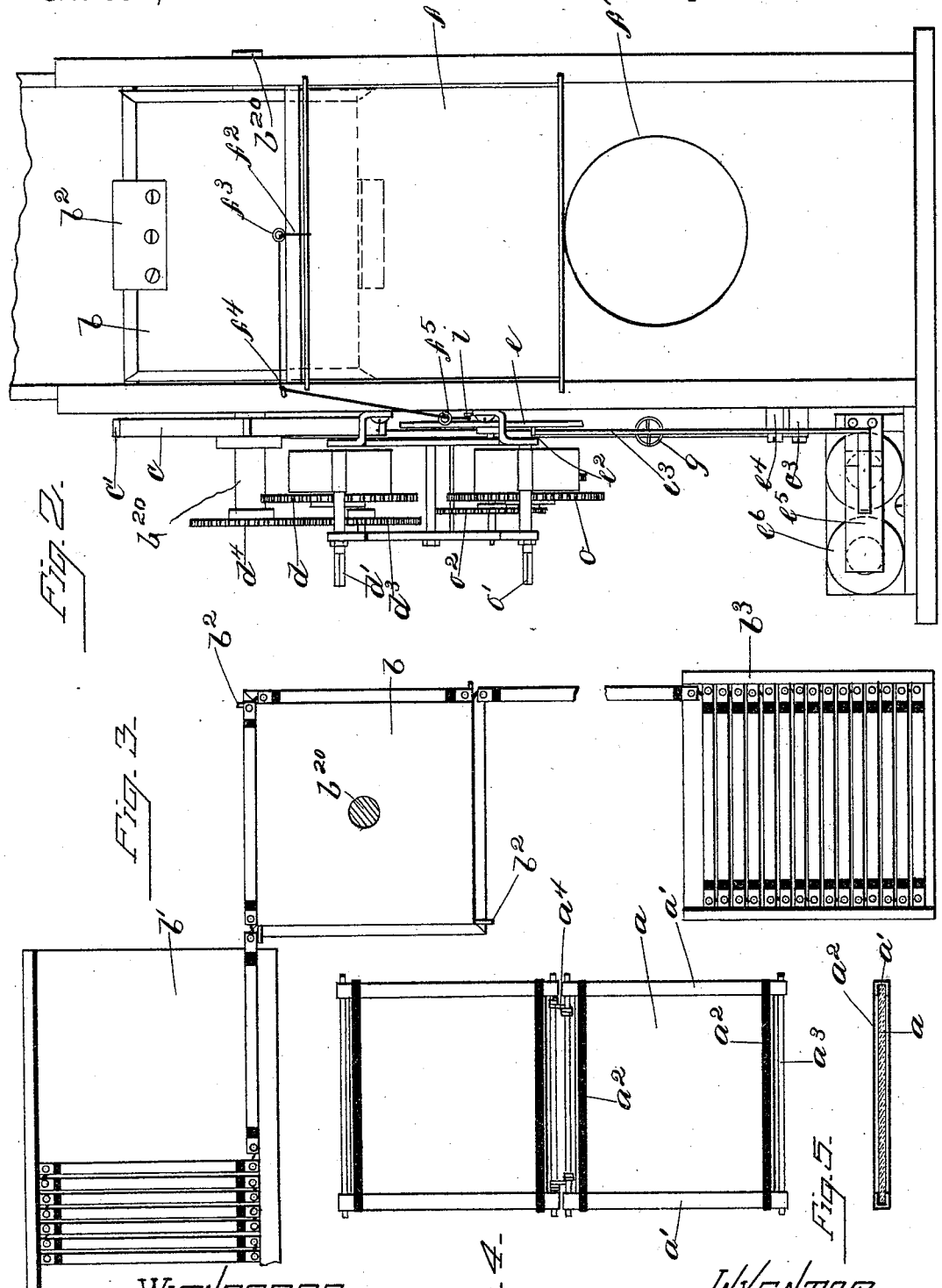

UNITED STATES PATENT OFFICE.

EDMUND HUDSON, OF WASHINGTON, DISTRICT OF COLUMBIA.

STEREOPTICON.

SPECIFICATION forming part of Letters Patent No. 518,104, dated April 10, 1894.

Application filed July 21, 1893. Serial No. 481,099. (No model.)

*To all whom it may concern:*

Be it known that I, EDMUND HUDSON, of Washington, District of Columbia, have invented an Improvement in Stereopticons, of which the following description, in connection with the accompanying drawings, is a specification, like letters on the drawings representing like parts.

This invention has for its object to construct a stereopticon or magic lantern adapted to be operated from a distant point, whereby the views may be successively displayed or projected upon the curtain at the will of the operator.

In accordance with this invention, a series of slides as they are commonly called, being transparent plates having the pictures thereon, adapted to be projected upon a curtain, are connected together as a chain, adapted to be folded one upon the other for compactness, and means are provided for moving the said slides intermittingly, but at the will of the operator, between the focusing lens and light, although the usual condensing lens will be provided and properly located. A screen is placed in front of the slide which is being displayed, or in front of the usual display opening, and means are provided for moving or operating said screen to expose the slide or uncover the display opening, and thereafter conceal the slide or cover said display opening while the next slide is being brought into position, said means being also operated at the will of the operator from a distant point.

The means or mechanism employed for moving the slides and for operating the screen are electro-magnetically controlled, and as herein shown, a single electro-magnet is employed, the circuit of which may be operated by the lecturer or exhibitor.

One way of carrying out my invention consists in providing two spring actuated trains, one for moving the slides, and the other for operating the screen, and the slide-operating train is released by the screen-operating train, and the screen-operating train is released by the electro-magnet, so that said electro-magnet directly or indirectly releases or controls both trains.

The screen operating train is adapted to so move or operate the screen, that it shall cover the display opening and thereafter uncover it, and the slide-operating train is designed to move the slide whenever the display opening is covered by the screen.

Figure 1, shows in side elevation a stereopticon embodying this invention; Fig. 2, an end view of the same; Fig. 3, an enlarged detail of the series of connected slides and actuating drum therefor; Fig. 4, a plan view of two of the connected slides; Fig. 5, a cross section of one of said slides, and Fig. 6, a detail of the stop wheel and releasing lever therefor, and releasing lever for the slide operating mechanism.

The slides each consist of a plate $a$ held in position between two side pieces or clips $a'$, $a'$, by means of rubber bands $a^2$, $a^2$, or otherwise, said side pieces or clips being loosely connected at the ends to cross bars $a^3$, above and below the plate. The cross bars $a^3$ and side pieces or clips $a'$ thus serve as separable frames or holders of the plates $a$, and new plates may thus be readily substituted whenever desired, but in lieu of the particular construction of separable frame thus shown any other form of frame may be employed. These frames or holders for the slides are loosely or flexibly connected together in a series or chain by links $a^4$ connected to the cross bars $a^3$, or otherwise, and for compactness said connected slides may be folded one upon or against another as represented in Fig. 3.

A quadrangular or many-sided drum $b$, is secured to a shaft $b^{20}$ having its bearings in the side plates or frame of the apparatus, the sides or faces of which are of sufficient width and length to accommodate the slides, and a box or case $b'$ is supported horizontally adjacent to the top of said drum which contains the folded chain or series of connected slides, the bottom or floor of said box or case being substantially in a plane with the uppermost side of the drum when said side occupies a horizontal plane.

Upon the corners of the drum $b$, or points where the plane sides meet, projections $b^2$ are formed, adapted to engage the cross bars $a^3$ of the slide frames, so that as said drum is rotated, with the slides in engagement therewith, said slides will be drawn out of the box or case $b'$, and being loosely connected together will hang by gravity from the drum before the display opening of the apparatus, which is so located with relation to the drum that whenever said drum is at rest, one of the slides will be directly in front of said opening, and as said drum continues to revolve intermittingly, the slides will pass by said display opening successively, entering another box or case $b^3$, in which they are folded one upon another as represented in Fig. 3.

Secured to the shaft $b^{20}$ which carries the drum $b$ is a stop wheel $c$ having as herein shown, four stop projections $c'$ corresponding with the four sides of the drum, and a lever $c^2$ is pivoted at $c^3$ having a hooked end which engages the stop projections $c'$.

The actuating train for the drum $b$ consists of the toothed wheel $d$ connected to the winding shaft $d'$ to which the main spring is attached, said wheel $d$ engaging a pinion on the shaft $d^2$, to which shaft is secured a toothed wheel $d^3$. A toothed wheel $d^4$ is secured to the shaft carrying the stop wheel $c$, which engages the tooth wheel $d^3$ of said spring actuated train. A stop wheel $e$ is secured to a shaft $e'$, having a stop projection $e^2$ which is engaged by a lever $e^3$ pivoted at $e^4$, the lower end of which lever is connected with the armature $e^5$ of an electro-magnet $e^6$ adapted to be included in an electric circuit not shown, to be operated in any usual or suitable way. The projection $e^2$ which is secured to or formed upon the stop wheel $e$, during each revolution of said wheel engages the lever $c^2$ moving it on its pivot to thereby release the stop wheel $c$. Thus it will be observed that by means of the electro-magnet $e^6$, through the intervention of the stop wheel $e$, the spring-actuated train for the drum $b$ will be released, permitting said drum to rotate one quarter of a revolution, and advancing the slides correspondingly.

A screen $f$, is provided for the display opening $f'$, it being herein represented as suspended from the end of the cord $f^2$ which passes through the eye $f^3$, thence through the eyes $f^4$ and $f^5$, being connected to a stud $i$ on the aforesaid stop wheel $e$, and at each revolution of said stop wheel it operates to lower and thereafter raise the screen.

The train for operating the stop wheel $e$ consists of the toothed driving wheel $o$, connected with the winding shaft $o'$ to which the main spring is connected, said toothed driving wheel $o$ engaging a pinion on the shaft $e'$ which carries the stop wheel $e$. A toothed wheel $o^2$, is secured to said shaft $e'$, which engages a pinion on the shaft $o^3$, to which shaft is secured a toothed wheel $o^4$, which engages a pinion on the shaft $o^5$ to which is secured a toothed wheel $o^6$, which engages a pinion on the shaft $o^7$, which carries a fan escapement, $o^8$. Whenever the stop wheel $e$ is released, and makes one complete revolution the screen will be lowered and thereafter raised.

Instead of employing a screen adapted to move vertically as shown, it is obvious that it may move in any other way, or by other mechanism than that specifically herein shown.

As a retractile spring for the releasing levers $c^2$, $e^3$, a coiled spring $g$, is interposed between, and connected at the ends to said levers.

The apparatus will be provided with any usual or suitable light A, and also with any usual or suitable condensing lens not shown, and also with any usual or suitable focusing lens, shown in dotted lines, Fig. 1.

In lieu of the particular construction of spring-actuated trains herein shown, any other form of train or equivalent motor mechanism adapted to be released or operated from a distant point, as by an electro-magnet, may be employed, which possesses the necessary functions of moving the screen to cover the display opening and thereafter returning it to its normal position, and during such time operating the slide.

The electrically controlled actuating mechanism for the chain or slides, and screen are applicable to ordinary stereopticons or magic lanterns.

One of the important uses to which my invention is applicable, and for which it is especially designed, is for lecturers who desire to illustrate their lectures with views of different kinds, and it will be seen that the lecturer may place the apparatus in a hall in proper position for use, and then while standing upon the platform delivering his lecture may illustrate the same as he may desire, and that the entire apparatus is under his own control. When he desires to bring the next picture to view he may simply press an electric button which he may hold in his hand, or he may operate any other form or construction of circuit controlling device to thereby operate the circuit of the electro-magnet which controls the operation of the slide and screen actuating mechanism. He thereby avoids the necessity of an assistant which is now imperative for operating the apparatus.

I claim—

1. In a device of the kind described, a series of transparent slides, and actuating mechanism for moving them successively between the light and lens, a controlling lever for said actuating mechanism, and an electro-magnet governing the operation of said controlling lever, the circuit of which is operated from a distant point at the will of the operator, substantially as described.

2. In a device of the kind described, several transparent slides loosely connected together, one after another, and actuating mechanism for moving them successively between the light and lens, a controlling lever for said actuating mechanism, and an electro-magnet governing the operation of said controlling lever, the circuit of which is operated from a distant point at the will of the operator, substantially as described.

3. In a device of the kind described, a series of loosely connected transparent slides, a drum over which they pass and by which they are held suspended between the light and lens, motor mechanism for rotating said drum for successively advancing said slides, a controlling lever for said motor mechanism, and an electro-magnet governing the operation of said controlling lever, the circuit of which is operated at will from a distant point, substantially as described.

4. In a device of the kind described, a series of loosely connected slides, a drum over which they pass and by which they are held suspended between the light and lens, motor mechanism for rotating said drum for successively advancing the slides, a controlling lever for said motor mechanism, and an electro-magnet governing the operation of said controlling lever, the circuit of which is operated at will from a distant point, the upper compartment containing the folded slides from which they are drawn by said drum, and the lower compartment which receives the slides folded as they are advanced by the drum, substantially as described.

5. In a device of the kind described, the transparent plates $a$, having pictures thereon adapted to be projected upon a curtain, two metallic end clips for each plate, extensible connections for said clips, whereby they may be separated to disengage the plate, and flexible connections connecting each pair of clips to the pair next to it, to thereby form a series of loosely connected detachable slides, substantially as described.

6. In a device of the kind described, a series of slides, and a screen, and actuating mechanism for successively moving the slides between the light and lens, and simultaneously operating the screen, a releasing lever therefor, an electro-magnet controlling the operation of said releasing lever, the circuit of which is operated from a distant point, substantially as described.

7. In a device of the kind described, a series of loosely connected slides, a drum over which they pass and by which they are held suspended between the light and lens to be displayed, a screen normally held at one side of the particular slide which is being displayed, motor mechanism for moving said screen into position between said light and lens and thereafter restoring it to its normal position, and for rotating said drum to advance the slides during the time the said screen is in its abnormal position, the controlling lever for said motor mechanism, and an electro-magnet governing the operation of said controlling lever, the circuit of which is operated at will from a distant point, substantially as described.

8. In a device of the kind described, a series of slides, an actuating train therefor, a screen and an actuating train therefor, a releasing device for the slide-actuating train controlled by the screen-actuating train, and a releasing device for the screen-actuating train, an electro-magnet controlling its operation, the circuit of which is operated from a distant point, substantially as described.

In testimony whereof I have signed my name to this specification in the presence of two subscribing witnesses.

EDMUND HUDSON.

Witnesses:
B. J. NOYES,
EVA S. ROUNDS.